(12) United States Patent
Wang et al.

(10) Patent No.: US 11,876,578 B2
(45) Date of Patent: Jan. 16, 2024

(54) INFORMATION TRANSMISSION METHOD AND APPARATUS, RELATED DEVICE, AND STORAGE DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fei Wang, Beijing (CN); Dapeng Wang, Beijing (CN); Yan Li, Beijing (CN); Nan Li, Beijing (CN); Guangyi Liu, Beijing (CN)

(73) Assignees: CHINA MOBILE COMMUNICATION CO., LTD RESEARCH INST, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 18/001,470

(22) PCT Filed: Jun. 16, 2021

(86) PCT No.: PCT/CN2021/100275
§ 371 (c)(1),
(2) Date: Dec. 11, 2022

(87) PCT Pub. No.: WO2021/254365
PCT Pub. Date: Dec. 23, 2021

(65) Prior Publication Data
US 2023/0261697 A1    Aug. 17, 2023

(30) Foreign Application Priority Data

Jun. 16, 2020  (CN) .......................... 202010550868.4

(51) Int. Cl.
*H04B 7/01*     (2006.01)
*H04L 5/00*     (2006.01)

(52) U.S. Cl.
CPC ............. *H04B 7/01* (2013.01); *H04L 5/0051* (2013.01)

(58) Field of Classification Search
None
See application file for complete search history.

(56) References Cited

U.S. PATENT DOCUMENTS

2017/0105112 A1    4/2017 Park
2020/0112498 A1*   4/2020 Manolakos ........... G01S 5/0236
(Continued)

FOREIGN PATENT DOCUMENTS

| CN | 104253771 A | 12/2014 |
|---|---|---|
| CN | 110891301 A | 3/2020 |

(Continued)

OTHER PUBLICATIONS

Mediatek Inc. "Remaining Issues on QCL", 3GPP TSG-RAN WG1 Meeting #92 R1-1801671, Mar. 2, 2018 (Mar. 2, 2018).

(Continued)

*Primary Examiner* — Diane L Lo
(74) *Attorney, Agent, or Firm* — Syncoda LLC; Feng Ma

(57) ABSTRACT

An information transmission method includes that: the network device transmits first information to a terminal, the first information indicating a first Reference Signal (RS) and a second RS, the first RS being associated with a Doppler shift, Doppler spread, average delay and delay spread, and the second RS being associated with one of the following: average delay; delay spread; and average delay and delay spread.

20 Claims, 4 Drawing Sheets

(56) References Cited

U.S. PATENT DOCUMENTS

| | | | | |
|---|---|---|---|---|
| 2020/0374079 | A1* | 11/2020 | Chervyakov | H04L 27/2657 |
| 2021/0127347 | A1* | 4/2021 | Akkarakaran | H04W 64/00 |
| 2021/0226751 | A1* | 7/2021 | Zhang | H04W 72/21 |
| 2021/0266215 | A1* | 8/2021 | Park | H04L 27/2657 |
| 2021/0320685 | A1* | 10/2021 | Venugopal | H04L 27/0014 |
| 2021/0359812 | A1* | 11/2021 | Bai | H04L 5/0094 |
| 2023/0068489 | A1* | 3/2023 | Abdelghaffar | H04L 5/0048 |

FOREIGN PATENT DOCUMENTS

| | | |
|---|---|---|
| CN | 111082909 A | 4/2020 |
| JP | 2023516448 A | 4/2023 |
| WO | 2021175149 A1 | 9/2021 |

OTHER PUBLICATIONS

International Search Report in the international application No. PCT/CN2021/100275, dated Aug. 27, 2021.

Written Opinion of the International Search Authority in the international application No. PCT/CN2021/100275, dated Aug. 27, 2021.

Supplementary European Search Report in the European application No. 21825267.4, dated Oct. 27, 2023, 8 pages.

ZTE, "Preliminary views on further enhancement for NR MIMO", 3GPP TSG RAN WG1 #101-e, R1-2003483, May 25-Jun. 5, 2020, the whole document, 19 pages.

Moderator (OPPO), "Fl summary for Multi-TRP/Panel Transmission", 3GPP TSG RAN WG1 #100b_e, R1-2002406, Apr. 20-30, 2020, p. 27-28, 34 pages.

Intel Corporation, "Views on the demodulation requirements for NR HST-SFN scenario", 3GPP TSG RAN WG4#92, R4-1908203, Aug. 26-30, 2019, the whole document, 8 pages.

CMCC, "Enhancements on HST-SFN deployment", 3GPP TSG RAN WG1 #102-e, Aug. 17-28, 2020, R1-2006204, the whole document, 11 pages.

* cited by examiner

INFORMATION TRANSMISSION METHOD AND APPARATUS, RELATED DEVICE, AND STORAGE DEVICE

CROSS-REFERENCE TO RELATED APPLICATIONS

This is a National Stage of International Application No. PCT/CN2021/100275 filed on Jun. 16, 2021, which claims priority to Chinese patent application No. 202010550868.4, filed on Jun. 16, 2020. The disclosures of the above-referenced applications are hereby incorporated by reference in their entirety.

TECHNICAL FIELD

The present disclosure relates to the field of wireless communication, and in particular to an information transmission method and apparatus, a related device, and a storage medium.

BACKGROUND

With the development of the communication technology, high mobility up to 500 km/h is expected to be enabled with an acceptable Quality of Service (QoS) in a communication system, which is envisioned in particular for High Speed Trains (HSTs). The HST scenario is also one of the important New Radio (NR) deployment scenarios in the 5th Generation Mobile Communication Technology (5G). The key characteristics of the HST scenario are consistent passenger user experience and critical train communication reliability with very high mobility.

One of the most important HST scenarios is a Single Frequency Network (SFN) deployment scenario, that is, an HST-SFN deployment scenario. In the HST-SFN deployment scenario, as shown in FIG. 1, a plurality of Remote Radio Heads (RRHs) are connected to one Base Band Unit (BBU) through optical fibers, and share the same cell Identity (ID), so as to reduce the number of handovers and improve user experience as much as possible. For each RRH, there are usually two Transmission and Reception Points (TRPs) which orient opposite directions along the track. At least in a 5G commercial network, the HST-SFN deployment is still the most important solution for an NR HST.

In the HST-SFN deployment scenario, how to accurately perform channel estimation when a terminal receives signals transmitted by the plurality of TRPs is an urgent problem to be solved at present.

SUMMARY

In order to solve the relevant technical problems, embodiments of the present disclosure provide an information transmission method and apparatus, a related device, and a storage medium.

The technical solutions of the embodiments of the present disclosure are implemented as follows.

At least one embodiment of the present disclosure provides an information transmission method, which is applied to a network device and may include the following operation.

First information is transmitted to a terminal. The first information indicates a first Reference Signal (RS) and a second RS, the first RS is associated with a Doppler shift, Doppler spread, average delay and delay spread, and the second RS is associated with one of the following:
average delay;
delay spread; and
average delay and delay spread.

In addition, according to at least one embodiment of the present disclosure, the first information is transmitted to the terminal by one of the following ways:
Radio Resource Control (RRC) signaling;
Medium Access Control Control Element (MAC CE); and
Downlink Control Information (DCI).

In addition, according to at least one embodiment of the present disclosure, the first RS may include a first Tracking Reference Signal (TRS); and the second RS may include a second TRS.

In addition, according to at least one embodiment of the present disclosure, the method may further include the following operation.

An uplink signal transmitted by the terminal is received. A modulated carrier frequency of the uplink signal is associated with a carrier frequency at which the first RS is received, or the modulated carrier frequency of the uplink signal is unassociated with a carrier frequency at which the second RS is received.

At least one embodiment of the present disclosure further provides an information transmission method, which is applied to a terminal and may include the following operation.

First information transmitted by a network side is received. The first information indicates a first RS and a second RS, the first RS is associated with a Doppler shift, Doppler spread, average delay, and delay spread, and the second RS is associated with one of the following:
average delay;
delay spread; and
average delay and delay spread.

In addition, according to at least one embodiment of the present disclosure, the first information transmitted by the network side is received by one of the following ways:
RRC signaling;
MAC CE; and
DCI.

In addition, according to at least one embodiment of the present disclosure, the second RS may be associated with the Doppler shift, the Doppler spread, the average delay, and the delay spread.

Using the first information, it is determined that the second RS is associated with one of:
average delay;
delay spread; and
average delay and delay spread.

In addition, according to at least one embodiment of the present disclosure, the first RS may include a first TRS; and the second RS may include a second TRS.

In addition, according to at least one embodiment of the present disclosure, the method may further include the following operations.

A modulated carrier frequency of an uplink signal is determined. The modulated carrier frequency of the uplink signal is associated with a carrier frequency at which the first RS is received, or the modulated carrier frequency of the uplink signal determining that the modulated carrier frequency of the uplink signal is unassociated with a carrier frequency at which the second RS is received.

The uplink signal is transmitted at the determined modulated carrier frequency.

At least one embodiment of the present disclosure provides an information transmission apparatus, which may include: a first transmitting unit.

The first transmitting unit may be configured to transmit first information to a terminal. The first information indicates a first RS and a second RS, the first RS is associated with a Doppler shift, Doppler spread, average delay and delay spread, and the second RS is associated with one of the following:

average delay;

delay spread; and average delay and delay spread.

At least one embodiment of the present disclosure provides an information transmission apparatus, which may include a first receiving unit.

The first receiving unit may be configured to receive first information transmitted by a network side. The first information indicates a first RS and a second RS, the first RS is associated with a Doppler shift, Doppler spread, average delay, and delay spread, and the second RS is associated with one of the following:

average delay;

delay spread; and average delay and delay spread.

At least one embodiment of the present disclosure further provides a network device, which may include: a first communication interface and a first processor.

The first communication interface may be configured to transmit first information to a terminal, the first information indicating a first RS and a second RS, the first RS is associated with a Doppler shift, Doppler spread, average delay, and delay spread, and the second RS is associated with one of the following:

average delay;

delay spread; and average delay and delay spread.

At least one embodiment of the present disclosure further provides a terminal, which may include: a second communication interface and a second processor.

The second communication interface may be configured to receive first information transmitted by a network side. The first information indicates a first RS and a second RS, the first RS is associated with a Doppler shift, Doppler spread, average delay, and delay spread, and the second RS is associated with one of the following:

average delay;

delay spread; and average delay and delay spread.

At least one embodiment of the present disclosure further provides a network device, which may include: a first processor and a first memory configured to store a computer program runnable on the processor.

Herein, the first processor may be configured to execute the steps of any method on the network device side when running the computer program.

At least one embodiment of the present disclosure further provides a terminal, which may include: a second processor and a second memory configured to store a computer program runnable on the processor.

Herein, the second processor may be configured to execute the steps of any method on the terminal side when running the computer program.

At least one embodiment of the present disclosure further provides a storage medium on which a computer program is stored. The computer program, when executed by a processor, implements the steps of any method on the network device side, or implements the steps of any method on the terminal side.

According to the information transmission method and apparatus, the related device, and the storage medium provided by the embodiments of the present disclosure, the network device transmits the first information to the terminal, the first information indicating the first RS and the second RS, the first RS being associated with the Doppler shift, the Doppler spread, the average delay and the delay spread, and the second RS being associated with one of the following: the average delay; the delay spread; and the average delay and delay spread. Therefore, in the HST-SFN scenario, when the terminal receives a plurality of downlink signals, delay-related parameters can be accurately estimated, to improve user experience.

DETAILED DESCRIPTION

Figure 1:
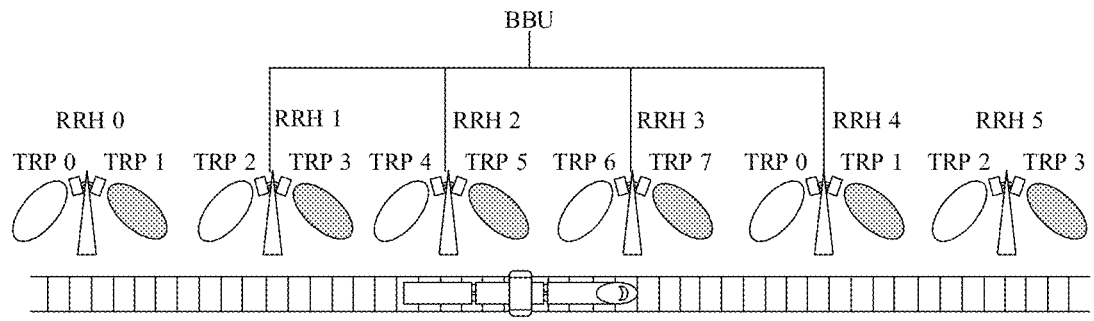
FIG. 1 is a schematic diagram of an HST-SFN deployment scenario in the related art.

The present disclosure is elaborated in detail below with reference to the drawings and embodiments.

The important parameters used to characterize the HST-SFN deployment scenario is listed in Table 1.

TABLE 1

| Parameter | Value |
| --- | --- |
| Carrier Frequency $f_C$ | 2.6 GHz |
| RRH Railway track distance $D_{min}$ | 150 m |
| Distance between two RRHs $D_s$ | 700 m |
| Cell Inter-Site | 3.2 km |

TABLE 1-continued

| Parameter | Value |
| --- | --- |
| Distance (ISD) | (4RRHs connect to 1 BBU) |
| RRH height (compared to railway track) | 25 m |

Herein, the values corresponding to the parameters are typical values used in commercial network deployment.

In the HST-SFN deployment scenario, the greatest challenge comes from a high Doppler shift due to high speed (e.g., 500 km/h), higher frequency (e.g., 2.6 GHz, 3.5 GHz) and the characteristics of SFN deployment. For example, the Doppler shift could reach up to 1.2 KHz fort 2.6 GHz and about 1.6 Hz for 3.5 GHz. In addition, when the train is in the middle of two RRHs, if at a frequency of 3.5 GHz, users in the train will experience+1.6 kHz and −1.6 kHz Doppler shifts simultaneously. The significant difference of the two Doppler shifts experienced simultaneously by the User Equipment (UE) will result in great performance degradation. Similarly, the significant difference of two kinds of delay experienced simultaneously by the UE may also result in great performance degradation.

Based on this, in various embodiments of the present disclosure, in the HST-SFN deployment scenario, an RS used by a terminal for delay estimation is indicated.

The embodiments of the present disclosure provide an information transmission method, which is applied to a network device and includes the following operation.

First information is transmitted to a terminal, the first information indicating a first Reference Signal (RS) and a second RS, the first RS being associated with a Doppler shift, Doppler spread, average delay and delay spread, and the second RS being associated with one of the following:
average delay;
delay spread;
average delay and delay spread.

Here, for the second RS, the first information actually indicates the second RS configured to determine at least one of the following parameters:
average delay; and
delay spread.

In practical application, the network device may specifically be a base station.

It is to be noted that, the solution of the embodiments of the present disclosure is applied to the HST-SFN deployment scenario, namely, a plurality of TRPs all transmit downlink signals (including the first RS and second RS), and at this time, the terminal may receive the plurality of downlink signals. When the plurality of TRPs transmit the RSs, the terminal can receive a plurality of Downlink Reference Signals (DL RSs).

In the embodiments of the present disclosure, the network device itself may determine which RS may be applicable to the terminal, namely, the network device determines the first RS according to needs, and no limitations are made thereto in the embodiments of the present disclosure.

In practical application, the first information may be transmitted to the terminal by one of the following ways:
RRC signaling;
MAC CE; and
DCI.

Herein, RRC signaling and the MAC CE may be referred to as high layer signaling, and the DCI is physical layer signaling.

In practical application, the RRC signaling may be RRC reconfiguration signaling.

In the related art, a plurality of Quasi Co-Location (QCL) types have been defined, and the role of a respective RS corresponding to each QCL type is also defined. The specific contents are as follows.

QCL-TypeA: {Doppler shift, Doppler spread, average delay, delay spread}, namely, an RS corresponding to QCL-TypeA may be configured to estimate the Doppler shift, the Doppler spread, the average delay and the average spread. That is, the RS corresponding to the QCL-TypeA may be associated with the Doppler shift, the Doppler spread, the average delay and the delay spread.

QCL-TypeB: {Doppler shift, Doppler spread}, namely, an RS corresponding to QCL-TypeB may be configured to estimate the Doppler shift and the Doppler spread. That is, the RS corresponding to the QCL-TypeB may be associated with the Doppler shift and the Doppler spread.

QCL-TypeC: {Doppler shift, average delay}, namely, an RS corresponding to QCL-TypeC may be configured to estimate the Doppler shift and the average delay. That is, the RS corresponding to the QCL-TypeC may be associated with the Doppler shift and the average delay.

QCL-TypeD: {Spatial Rx parameter}, namely, an RS corresponding to QCL-TypeD may be configured to estimate a spatial reception parameter. That is, the RS corresponding to the QCL-TypeD may be associated with the spatial reception parameter.

In a general scenario, channel estimation may be performed through the above RS. However, in the HST-SFN deployment scenario, the channel may not be accurately estimated by the above parameters. Therefore, the QCL type may be defined, the newly defined QCL type corresponds to one DL RS, namely, the second RS, configured for delay-related estimation.

Based on this, in an embodiment, the newly defined QCL type corresponds to the second RS.

Exemplarily, 'QCL-TypeE': {average delay, delay spread} may be defined, or 'QCL-TypeE': {average delay} may be defined, or 'QCL-TypeE': {delay spread} may be defined.

Herein, 'QCL-TypeE': {average delay, delay spread} represents that the second RS may be configured to estimate the average delay and the delay spread, namely, the second RS is associated with the average delay and the delay spread. 'QCL-TypeE': {average delay} represents that the corresponding RS may be configured to estimate the average delay, namely, the second RS is associated with the average delay. 'QCL-TypeE': {delay spread} represents that the corresponding RS may be configured to estimate the delay spread, namely, the second RS is associated with the delay spread.

In practical application, a Transmission Configuration Indication-State (TCI-State) is configured to indicate the RS corresponding to at least one QCL type configured by the terminal, so that the newly defined QCL type may be indicated through the TCI-State.

Exemplarily, the newly defined QCL type may be indicated to the terminal by the network device as qcl-Type3 in the TCI-State, and the content of the TCI-State is as follows:

```
TCI-State ::=           SEQUENCE {
   tci-StateId             TCI-StateId,
      qcl-Type1               QCL-Info,
   qcl-Type2               QCL-Info
```

```
                                -continued
OPTIONAL, -- Need R
    qcl-Type3                   QCL-Info
OPTIONAL, -- Need R
    ...
}
QCL-Info ::=                    SEQUENCE {
    cell                        ServCellIndex
    OPTIONAL, -- Need R
    bwp-Id                      BWP-Id
    OPTIONAL, -- Cond CSI-RS-Indicated
        referenceSignal                 CHOICE {
            csi-rs                      NZP-CSI-RS-ResourceId,
            ssb                         SSB-Index
        },
    qcl-Type                    ENUMERATED {typeA, typeB, typeC,
                                typeD, typeE },
    ...
}
```

Herein, the QCL type corresponding to qcl-Type1 and qcl-Type2 may be understood according to the related art, which will not be elaborated herein.

In practical application, the second RS may also be based on the existing QCL-TypeA, namely, the second RS may be associated with the Doppler shift, the Doppler spread, the average delay and the delay spread. The terminal may determine, based on the first information, that the second RS is associated with one of the following:
  average delay;
  delay spread; and
  average delay and delay spread.

In practical application, there may be at least one RS corresponding to the QCL-TypeA configured by a network side, at this time, the terminal may determine that at least one of the at least one RS corresponding to the QCL-TypeA configured by the network side is the second RS according to the first information, namely, at least one of the at least one RS corresponding to the QCL-TypeA is associated with one of the following:
  average delay;
  delay spread; and
  average delay and delay spread.

In practical application, the network device needs to configure at least one RS to the terminal for channel estimation, which is transmitted by the plurality of TRPs.

In the embodiment of the present disclosure, the first RS includes a first TRS; and the second RS includes a second TRS.

The second RS may include one or more RSs.

In practical application, the terminal transmits an uplink signal (such as the RS) based on the indication of the network device, so that the network device may perform Doppler shift estimation.

Based on this, in an embodiment, the method may further include the following operation.

An uplink signal transmitted by the terminal is received. The modulated carrier frequency of the uplink signal (which may also be understood as the carrier frequency of the uplink signal) is determined by using the first RS, that is, the modulated carrier frequency of the uplink signal is associated with the carrier frequency at which the first RS is received; or the modulated carrier frequency of the uplink signal is unassociated with the carrier frequency at which the second RS is received.

Here, the network device may perform frequency shift estimation by using the received uplink signal and determine a Doppler shift compensation value of at least one TRP.

Specifically, the network device performs frequency shift estimation on the plurality of TRPs to obtain a frequency shift of the plurality of TRPs with respect to the carrier frequency of the first RS.

A Doppler shift compensation value of at least one TRP is determined by using the obtained frequency shift of the plurality of TRPs with respect to the carrier frequency of the first RS. The at least one TRP does not contain the TRP transmitting the first RS.

Herein, since the second RS is only configured to determine the average delay and/or delay spread and may not be configured to perform Doppler frequency related estimation, the terminal determines the carrier frequency of the uplink signal by using the first RS which may be configured to the estimate the Doppler frequency related estimation.

In the embodiments of the present disclosure, the specific processing procedure of performing frequency shift estimation on the plurality of TRPs by using the received uplink signals is not limited. At the same time, a specific processing procedure of determining the Doppler shift compensation value of the at least one TRP by using the obtained frequency shift of the plurality of TRPs with respect to the carrier frequency of the first RS is also not limited.

Since the RS for Doppler estimation is indicated to the terminal, when the terminal receives the plurality of downlink signals, the Doppler related parameters may be accurately estimated, so that the downlink Doppler pre-compensation in the HST-SFN scenario may be realized, thereby improving the user experience when receiving the plurality of downlink signals with a large difference in Doppler shift.

Herein, in the embodiments of the present disclosure, the network device itself may determine which RS may be applicable to the terminal, namely, the network device determines the first RS and the second RS according to needs, and no limitations are made thereto in the embodiments of the present disclosure.

In practical application, there may be one or more RSs associated with the uplink modulated carrier frequency of the terminal, that is, the first RS may include at least one RS. Accordingly, there may be one or more RSs unassociated with the uplink modulated carrier frequency of the terminal, that is, the second RS may include at least one RS.

Accordingly, the embodiments of the present disclosure further provide an information transmission method, which is applied to a terminal and includes the following operation.

First information transmitted by a network side is received, the first information indicating a first RS and a second RS, the first RS being associated with a Doppler shift, Doppler spread, average delay, and delay spread, and the second RS being associated with one of the following:
  average delay;
  delay spread; and
  average delay and delay spread.

In an embodiment, the first information transmitted by the network side is received by one of the following ways:
  RRC signaling;
  MAC CE; and
  DCI.

Specifically, when the network side transmits the first information through the RRC signaling, the terminal receives the first information through the RRC signaling. When the network side transmits the first information through the MAC CE, the terminal receives the first information through the MAC CE. When the network side transmits the first information through the DCI, the terminal receives the first information through the DCI.

In practical application, the second RS may be based on the existing QCL-TypeA, namely, the second RS may be associated with the Doppler shift, the Doppler spread, the average delay and the delay spread. After receiving the first information, the terminal may determine, based on the first information, that the second RS is associated with one of the following:
- average delay;
- delay spread; and
- average delay and delay spread.

Exemplarily, it is pre-defined that, as long as the terminal receives the first information, it can determine that the second RS is associated with one of the following:
- average delay;
- delay spread; and
- average delay and delay spread.

For another example, the first information includes a specific ID. When indicating the second RS, as long as the specific ID is seen, it may be determined that the second RS is associated with one of the following:
- average delay;
- delay spread; and
- average delay and delay spread.

In an embodiment, the method may further include the following operations.

A modulated carrier frequency of an uplink signal (which may also be understood as an uplink modulated carrier frequency or an uplink carrier frequency) is determined.

The uplink signal is transmitted at the determined modulated carrier frequency. The transmitted uplink signal may be configured to determine, by the network side, a Doppler shift compensation value of at least one TRP. The at least one TRP does not contain the TRP transmitting the first RS.

Herein, in the embodiments of the present disclosure, the specific processing procedure of determining the modulated carrier frequency of the uplink RS by using the first RS is not limited.

In practical application, the terminal may determine the modulated carrier frequency of the uplink signal at least based on the first RS (at least one other RS functionally similar to the first RS may be further used), so that the modulated carrier frequency of the uplink signal is associated with the carrier frequency at which the first RS is received, or the modulated carrier frequency of the uplink signal determines that the modulated carrier frequency of the uplink signal is unassociated with the carrier frequency at which the second RS is received.

Herein, by using a predefined way, after receiving the first information, the terminal may determine that the modulated carrier frequency of the uplink signal is associated with the carrier frequency at which the first RS is received, or the modulated carrier frequency of the uplink signal determines that the modulated carrier frequency of the uplink signal is unassociated with the carrier frequency at which the second RS is received. The network device may also indicate that the modulated carrier frequency of the uplink signal is associated with the carrier frequency at which the first RS is received, or that the modulated carrier frequency of the uplink signal determines that the modulated carrier frequency of the uplink signal is unassociated with the carrier frequency at which the second RS is received.

Here, in a case where the network device indicates that the modulated carrier frequency of the uplink signal of the terminal is associated with the carrier frequency at which the first RS is received, the indication is associated with the first RS. The network device indicates that the uplink modulated carrier frequency of the terminal is associated with the carrier frequency at which the first RS is received, which may also be understood as that the network device indicates, to the terminal, determining the carrier frequency of the uplink signal at least according to the carrier frequency at which the first RS is received, namely, indicating, to the terminal, determining the modulated carrier frequency of the uplink signal at least according to the reception of the first RS.

When the network device indicates that the uplink modulated carrier frequency of the terminal is unassociated with the carrier frequency at which the second RS is received, the indication is associated with the second RS. The network device indicates that the uplink modulated carrier frequency of the terminal is unassociated with the carrier frequency at which the second RS is received, which may also be understood as that, the network device indicates, to the terminal, not determining the carrier frequency of the uplink signal according to the carrier frequency at which the second RS is received, namely, the network device indicates, to the terminal, not determining the carrier frequency of the uplink signal according to the reception of the second RS.

In the embodiments of the present disclosure, the specific processing procedure of determining the modulated carrier frequency of the uplink RS is not limited.

Figure 2:
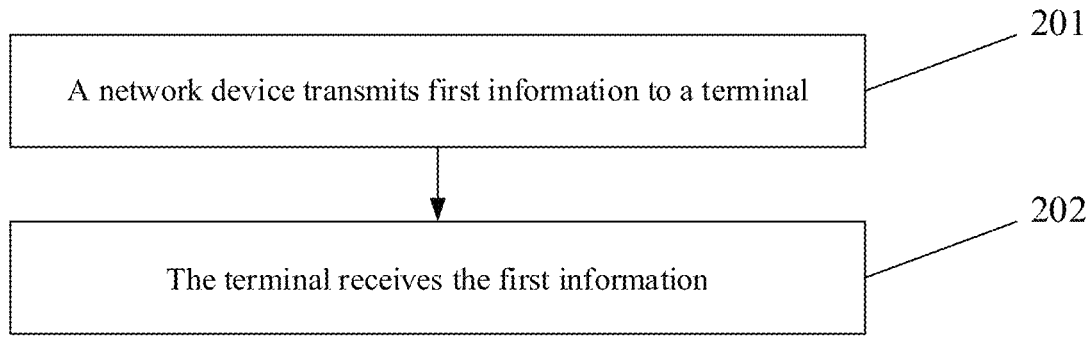
FIG. 2 is a flowchart of an information transmission method according to an embodiment of the present disclosure.

The embodiments of the present disclosure further provide an information transmission method, as shown in FIG. 2, which includes the following operations.

At S201, a network device transmits first information to a terminal, the first information indicating a first RS and a second RS, the first RS being associated with a Doppler shift, Doppler spread, average delay and delay spread, and the second RS being associated with one of the following:
- average delay;
- delay spread; and
- average delay and delay spread.

At S202, the terminal receives the first information.

It is to be noted that the specific processing processes of the network device and the terminal have been described in detail above, which will not be elaborated herein.

According to the information transmission method provided by the embodiments of the present disclosure, the network device transmits the first information to the terminal, the first information indicating the first RS and the second RS, the first RS being associated with the Doppler shift, the Doppler spread, the average delay and the delay spread, and the second RS being associated with one of the following: the average delay; the delay spread; and the average delay and delay spread. Since the RS configured to perform delay estimation is indicated to the terminal, in the HST-SFN scenario, when the terminal receives a plurality of downlink signals, delay-related parameters can be accurately estimated. In this way, accurate estimation of downlink delay in the HST-SFN scenario can be realized, so as to improve the user experience when receiving the plurality of downlink signals with a large delay difference.

The present disclosure is further described in detail below in combination with the application embodiments.

Application Embodiment 1

Figure 3:
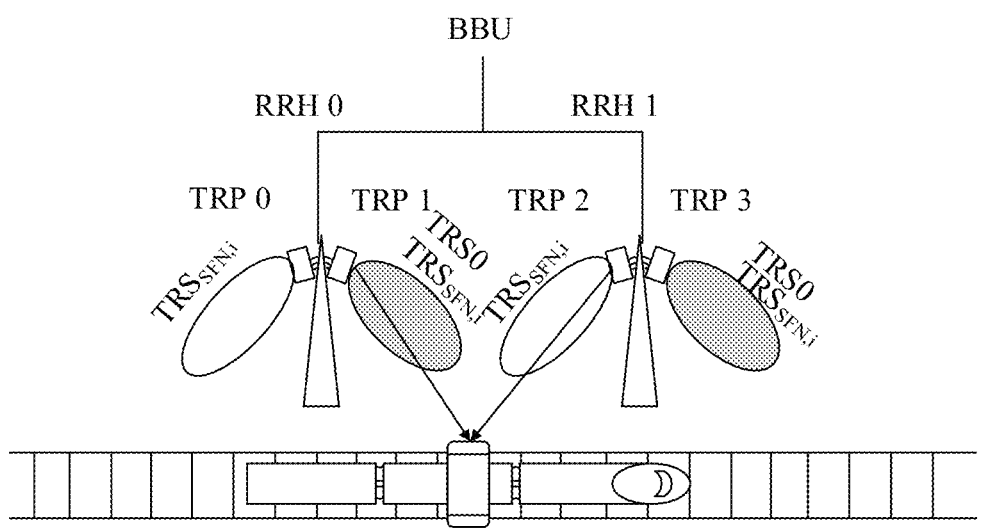
FIG. 3 is a schematic diagram of an HST scenario according to an application embodiment of the present disclosure.

In the application embodiment, as shown in FIG. 3, assuming that in an HST scenario, that is, in an HST-SFN scenario, TRP0, TRP1, TRP2 and TRP3 are four TRPs connected to the same cell, and assuming that an HST user is located at the position shown in FIG. 3, at this time, since the antenna orientations of TRP0 and TRP3 may make the UE receive the signals transmitted by TRP0 and TRP3 weaker, the influence of the signals transmitted by TRP0 and TRP3 may be ignored.

Meanwhile, a base station transmits high layer signaling (such as RRC configuration signaling or MAC CE) or physical layer signaling (such as DCI) to the UE. The signaling is associated with TRS0 (namely, a third RS), and the signaling indicates that the modulated carrier frequency of the UE is associated with the carrier frequency at which TRS0 is received, or the signaling indicates that the UE determines the carrier frequency of the uplink signal according to the carrier frequency at which TRS0 is received. Or, the signaling is associated with $TRS_{SFN,i}$, (namely, a fourth RS, a TRS which may be transmitted by all TRPs connected to the same cell), and the signaling indicates that the modulated carrier frequency of the UE is unassociated with the carrier frequency at which $TRS_{SFN,i}$ is received, or the signaling indicates that the UE does not determine the carrier frequency of the uplink signal according to the carrier frequency at which $TRS_{SFN,i}$ is received.

In the application embodiment, the base station configures periodic TRS0 and $TRS_{SFN,i}$, and the plurality of TRPs (such as TRP1 and TRP2) connected to the same cell for the UE, TRS0 being transmitted by only a part of the TRP (it is assumed that TRS0 is transmitted by TRP1, and TRP2 does not transmit TRS0), and $TRS_{SFN,i}$ being transmitted by the same TRP as the plurality of TRPs transmitting a Physical Downlink Shared Channel (PDSCH) and a Demodulation Reference Signal (DMRS) (it is assumed that $TRS_{SFN,i}$, PDSCH and DMRS are all transmitted commonly by TRP1 and TRP2).

Figure 4:
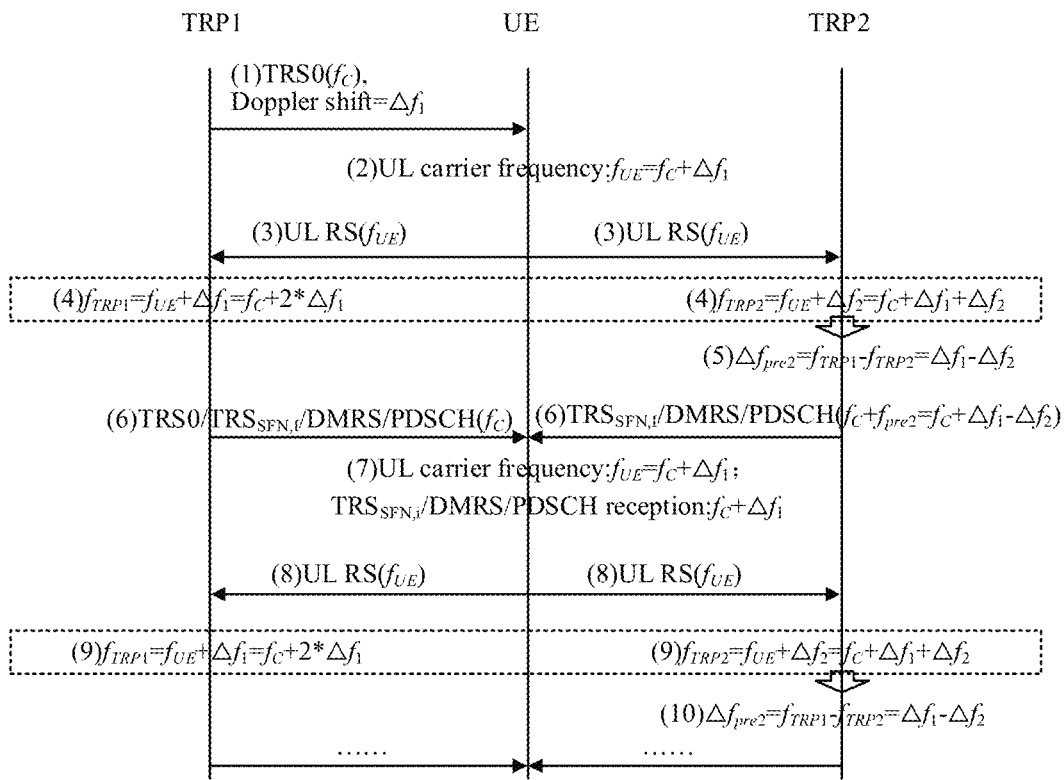
FIG. 4 is a flowchart of performing Doppler shift pre-compensation according to an application embodiment of the present disclosure.

A flow of performing, by a base station, Doppler shift pre-compensation is described below in combination with FIG. 4, and the flow includes the following operations.

At S1, TRP1 transmits TRS0 at the carrier frequency $f_C$.

At S2, the UE receives TRS0, and determines the uplink modulated carrier frequency based on TRS0.

Here, assuming that the Doppler shift is $\Delta f_1$, the uplink modulated carrier frequency determined based on the reception of TRS0 is $f_{UE}=f_C+\Delta f_1$.

At S3, the UE transmits the uplink RS, such as a Sounding Reference Signal (SRS), at the carrier frequency $f_{UE}$.

At S4, frequency shift (namely, frequency shift) estimation is performed based on the uplink RS.

Here, assuming that TRP1 estimates the frequency shift with respect to $f_C$ to be $2\Delta f_1$ (the carrier frequency corresponding to TRP1 is $f_{TRP1}=f_{UE}+\Delta f_1=f_C+\Delta f_1+\Delta f_1=f_C+2\Delta f_1$), and TRP2 estimates the frequency shift with respect to $f_C$ to be $\Delta f_1+\Delta f_2$ (the carrier frequency corresponding to TRP2 is $f_{TRP2}=f_{UE}+\Delta f_2=f_C+\Delta f_1+\Delta f_2$). $\Delta f_2$ is the Doppler shift corresponding to TRP2.

At S5, the base station calculates a Doppler shift pre-compensation value used by the user for TRP2.

Specifically, $\Delta f_{pre2}=\Delta f_1-\Delta f_2$.

At S6, TRP1 transmits $TRS_{SFN,i}$, DMRS and PDSCH at the carrier frequency $f_C$. TRP2 transmits $TRS_{SFN,i}$, DMRS and PDSCH at the carrier frequency $f_C+\Delta f_{pre2}=f_C+\Delta f_1-\Delta f_1$. TRP1 transmits TRS0 at the carrier frequency $f_C$.

At S7, the UE receives TRS0, $TRS_{SFN,i}$, DMRS and PDSCH at the carrier frequency $f_C+\Delta f_1$, and determines the uplink carrier frequency as $f_{UE}=f_C+\Delta f_1$ based on the reception of TRS0.

Here, the UE determines the uplink modulated carrier frequency by using the carrier frequency $f_C$, namely, the uplink modulated carrier frequency is $f_{UE}=f_C+\Delta f_1$.

At S8, the UE transmits the uplink RS, such as SRS, at the carrier frequency $f_{UE}$.

At S9, frequency shift estimation is performed based on the uplink RS. Assuming that TRP1 estimates the frequency shift with respect to $f_C$ to be $2\Delta f_1$, TRP2 estimates the frequency shift with respect to $f_C$ to be $\Delta f_1+\Delta f_1$.

At S10, the base station calculates a Doppler shift pre-compensation value used by the user for TRP2, specifically, $\Delta f_{pre2}=\Delta f_1-\Delta f_2$, and the subsequent steps are continuously executed.

It is to be noted that, since the periodic TRS is transmitted periodically, the above process is performed periodically, and the order of some of the above steps is merely exemplary and not a strict sequence.

Application Embodiment 2

In the application embodiment, a new QCL type is defined and corresponds to a DL RS, such as 'QCL-TypeE': {average delay, delay spread}, or 'QCL-TypeE': {average delay} is defined, or 'QCL-TypeE': {delay spread} is defined. The new QCL type may be indicated to UE by the network side as qcl-Type3 in a TCI-State.

The base station transmits indication signaling to the UE through high layer signaling (such as RRC configuration or MAC CE) or physical layer signaling (such as DCI), the indication signaling being associated with a first TCI-State, and the first TCI-State indicating an RS corresponding to 'QCL-TypeA' and an RS corresponding to 'QCL-TypeE' of the UE. It is assumed that the RS corresponding to 'QCL-TypeA' is a first TRS (namely, a first RS), and it is assumed that the RS corresponding to 'QCL-TypeE' is a second TRS (namely, a second RS).

Herein, for a DMRS of a PDSCH, the UE expects the TCI-State to indicate one of the following QCL types:

'QCL-TypeA' with a CSI-RS resource in a NZP-CSI-RS-ResourceSet configured with higher layer parameter trs-Info and, when applicable, 'QCL-TypeD' with the same CSI-RS resource;

'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition;

QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource; and 'QCL-TypeA' with a CSI-RS resource in a NZP-CSI-RS-ResourceSet configured with higher layer parameter trs-Info and, when applicable, 'QCL-TypeE' with another CSI-RS resource in a NZP-CSI-RS-ResourceSet configured with higher layer parameter trs-Info.

Figure 5:
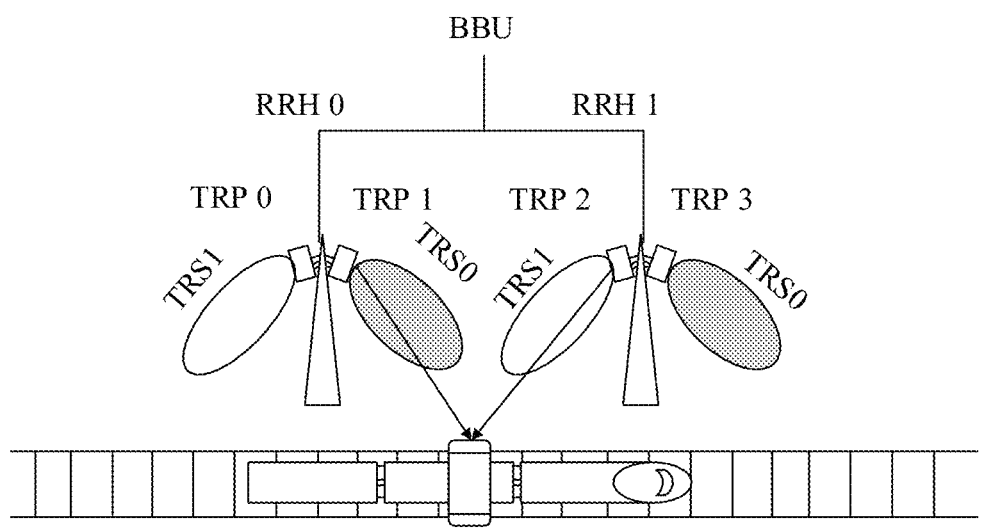
FIG. 5 is a schematic diagram of an HST scenario according to an application embodiment of the present disclosure.

Specifically, in the application embodiment, as shown in FIG. 5, assuming that in an HST scenario, that is, in an HST-SFN scenario, TRP0, TRP1, TRP2 and TRP3 are four TRPs connected to the same cell, and it is assumed that an HST user is located at the position shown in FIG. 5, at this time, since the antenna orientations of TRP0 and TRP3 may make the UE receive the signals transmitted by TRP0 and TRP3 weaker, the influence of the signals transmitted by TRP0 and TRP3 may be ignored.

Assuming that the first TRS is TRS0, and the second TRS is TRS1, the base station transmits first indication signaling (namely, first information) to the UE through high layer signaling or physical layer signaling, the first indication signaling indicating one TCI-State to the UE, and the TCI-State indicating an RS TRS0 corresponding to 'QCL- TypeA' and an RS TRS1 corresponding to 'QCL-TypeE' to the UE. According to the indication, the UE estimates a Doppler shift, doppler spread, average delay and average spread by using TRS0, and the UE estimates the average delay and/or the delay spread by using only TRS1, that is, the UE estimates the Doppler shift and the Doppler spread by using TRS0, and the UE estimates the average delay and/or delay spread by using TRS0 and TRS1 together.

In the application embodiment, a processing flow indicating that the carrier frequency of the terminal is associated with the carrier frequency of which DL RS and/or is unassociated with the carrier frequency of which DL RS may also be used. In this case, the base station may also transmit second indication signaling to the UE through high layer signaling (such as RRC configuration or MAC CE) or physical layer signaling (such as DCI), the second indication signaling indicating that the modulated carrier frequency of the UE is associated with the carrier frequency at which TRS0 is received, and the second signaling may also indicating that the UE determines the carrier frequency of the uplink signal based on the carrier frequency at which TRS0 is received.

In the application embodiment, the base station configures periodic TRS0 and TRS1, and the plurality of TRPs (such as TRP1 and TRP2) connected to the same cell for the UE, TRS0 and TRS1 being transmitted by only a part of the TRP (for example, TRS0 is transmitted by TRP1, and TRP2 does not transmit TRS0; TRS1 is transmitted by TRP2, and TRP1 does not transmit TRS1), and a PDSCH and a DMRS are transmitted commonly by TRS1 and TRS2 (for example, the PDSCH and the DMRS are transmitted commonly by TRP1 and TRP2).

Figure 6:
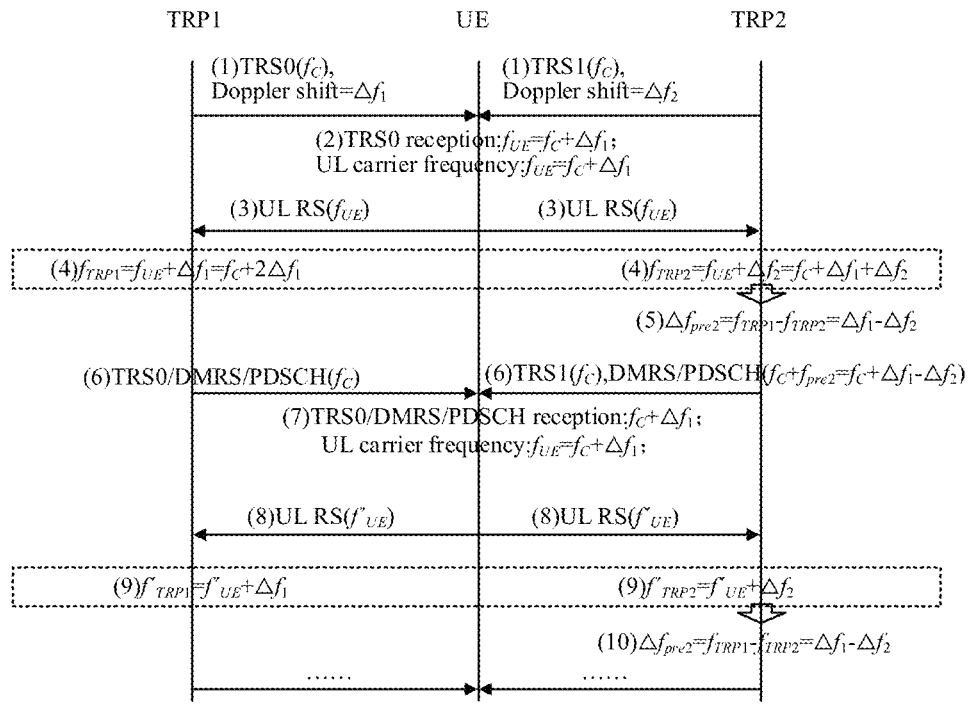
FIG. 6 is another flowchart of performing Doppler shift pre-compensation according to an application embodiment of the present disclosure.

A flow of performing, by a base station, Doppler shift pre-compensation is described below in combination with FIG. 6, and the flow includes the following operations.

At S1, TRP1 transmits TRS0 at the carrier frequency $f_C$, TRP2 transmits TRS1 at the carrier frequency $f_C$, the base station transmits second indication signaling to the UE through high layer signaling or physical layer signaling, and the second indication signaling indicates, to the UE, determining the carrier frequency of the uplink signal based on the carrier frequency of TRS0.

At S2, the UE receives TRS0, and determines the uplink modulated carrier frequency based on TRS0.

Here, assuming that the Doppler shift corresponding to TRP1 is $\Delta f_1$, the uplink modulated carrier frequency determined based on the reception of TRS0 is $f_{UE}=f_C+\Delta f_1$.

At S3, the UE transmits the uplink RS, such as an SRS, at the carrier frequency $f_{UE}$.

At S4, frequency shift estimation is performed based on the uplink RS.

Here, it is assumed that TRP1 estimates the frequency shift with respect to $f_C$ to be $2\Delta f_1$ (the carrier frequency corresponding to TRP1 is $f_{TRP1}=f_{UE}+\Delta f_1=f_C+\Delta f_1+\Delta f_1=f_C+2\Delta f_1$), and TRP2 estimates the frequency shift with respect to $f_C$ to be $\Delta f_1+\Delta f_2$ (the carrier frequency corresponding to TRP2 is $f_{TRP2}=f_{UE}+\Delta f_1=f_C+\Delta f_1+\Delta f_2$). $\Delta f_2$ is the Doppler shift corresponding to TRP2.

At S5, the base station calculates a Doppler shift pre-compensation value used by the user for TRP2.

Specifically, $\Delta f_{pre2}=\Delta f_1-\Delta f_2$.

At S6, the base station transmits a DL scheduling DCI to the UE, the DCI indicating one TCI-State, and the TCI-State being an RS TRS0 corresponding to the 'QCL-TypeA' and an RS TRS1 corresponding to the 'QCL-TypeE' indicated by the UE. TRP1 and TRP2 transmit the DMRS and the PDSCH scheduled by the DCI at the carrier frequencies $f_C$ and $f_C+\Delta f_{pre2}=f_C+\Delta f_1-\Delta f_2$ respectively, and TRP1 transmits TRS0 at the carrier frequency $f_C$. TRP2 transmits TRS1 at the carrier frequency $f_C$.

At S7, the UE receives TRS0, the DMRS and the PDSCH at the carrier frequency $f_C+\Delta f_1$, and the UE determines the uplink carrier frequency as $f_{UE}=f_C+\Delta f_1$ based on the reception of TRS0. TRS1 is configured for delay-related estimation in DMRS channel estimation.

Here, the UE determines the uplink modulated carrier frequency by using the carrier frequency $f_C$, namely, the uplink modulated carrier frequency is $f_{UE}=f_C+\Delta f_1$.

At S8, the UE transmits the uplink RS, such as an SRS, at the carrier frequency $f_{UE}$.

At S9, frequency shift estimation is performed based on the uplink RS. Assuming that TRP1 estimates the frequency shift with respect to $f_C$ to be $2\Delta f_1$, TRP2 estimates the frequency shift with respect to $f_C$ to be $\Delta f_1+\Delta f_2$.

At S10, the base station calculates a Doppler shift pre-compensation value used for TRP2.

Specifically, $\Delta f_{pre2}=\Delta f_1-\Delta f_2$, and the subsequent steps are continuously executed.

It is to be noted that, since the periodic TRS is transmitted periodically, the above process is performed periodically, and the order of some of the above steps is merely exemplary and not a strict sequence.

Application Embodiment 3

The difference between the application embodiment and the application embodiment 2 lies in that a base station transmits first indication signaling to UE through high layer signaling or physical layer signaling, the first indication signaling indicating one TCI-State to the UE, and the TCI-State indicating two RSs corresponding to 'QCL-TypeA' to the UE: TRS0 and TRS1. By means of pre-configuration or signaling indication, the UE is indicated that a certain RS (such as TRS1 in the embodiment) is only configured for estimation of average delay and/or delay spread. According to these indications, the UE estimates a Doppler shift, Doppler spread, average delay and average spread by using TRS0, and the UE estimates the average delay and/or the delay spread by using only TRS1, that is to say, the UE estimates the Doppler shift and the Doppler spread by using TRS0, and the UE estimates the average delay and/or the delay spread by using TRS0 and TRS1 together.

Application Embodiment 4

The difference between the application embodiment and the application embodiment 3 lies in that a base station transmits first indication signaling to UE through high layer signaling or physical layer signaling, the first indication signaling indicating two TCI-States to the UE, and each TCI-State indicating one RS, i.e., TRS0 or TRS1, corresponding to 'QCL-TypeA' to the UE. By means of pre-configuration or signaling indication, the UE is indicated that a RS of 'QCL-TypeA' corresponding to a certain TCI State (such as TRS1 in the embodiment) is only configured for estimation of the average delay and/or delay spread. According to these indications, the UE estimates a Doppler shift, Doppler spread, average delay and average spread by using TRS0, and the UE estimates the average delay and/or the delay spread by using only TRS1, that is to say, the UE estimates the Doppler shift and the Doppler spread by using TRS0, and the UE estimates the average delay and/or the delay spread by using TRS0 and TRS1 together.

Figure 7:
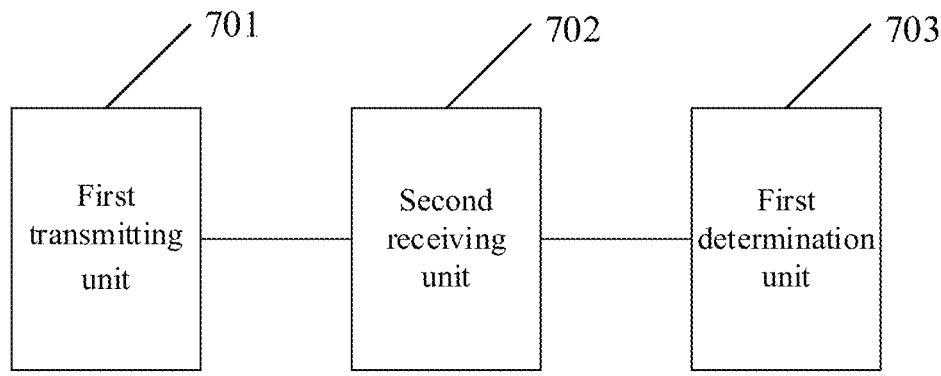
FIG. 7 is a schematic structural diagram of an information transmission apparatus arranged on a network device according to an embodiment of the present disclosure.

In order to implement the method in the embodiments of the present disclosure, the embodiments of the present disclosure further provide an information transmission apparatus, which is arranged on a network device, as shown in FIG. 7, and includes a first transmitting unit 701.

The first transmitting unit 701 is configured to transmit first information to a terminal, the first information indicating a first RS and a second RS, the first RS being associated with a Doppler shift, Doppler spread, average delay and delay spread, and the second RS being associated with one of the following:
average delay;
delay spread; and
average delay and delay spread.

In an embodiment, the first transmitting unit 701 is configured to transmit the first information to the terminal by one of the following ways:
RRC signaling;
MAC CE; and
DCI.

In an embodiment, as shown in FIG. 7, the apparatus may further include: a second receiving unit 702.

The second receiving unit 702 is configured to receive an uplink signal transmitted by the terminal, a modulated carrier frequency of the uplink signal being associated with a carrier frequency at which the first RS is received, or the modulated carrier frequency of the uplink signal determines that the modulated carrier frequency of the uplink signal being unassociated with a carrier frequency at which the second RS is received.

Herein, in an embodiment, as shown in FIG. 7, the apparatus may further include a first determination unit 703.

The first determination unit 703 is configured to:
perform frequency shift estimation by using the received uplink signal and determine a Doppler shift compensation value of at least one TRP. The at least one TRP does not contain a TRP transmitting the second RS.

In practical application, the first transmitting unit 701 and the second receiving unit 702 may be implemented by a communication interface in the information transmission apparatus. The first determination unit 703 may be implemented by a processor in the information transmission apparatus.

Figure 8:
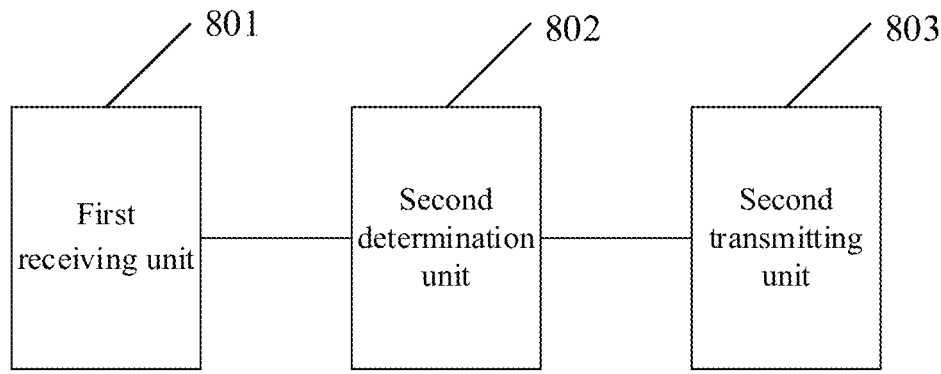
FIG. 8 is a schematic structural diagram of an information transmission apparatus arranged on a terminal according to an embodiment of the present disclosure.

In order to implement the method on the terminal side in the embodiments of the present disclosure, the embodiments of the present disclosure further provide an information transmission apparatus, which is arranged on a terminal, as shown in FIG. 8, and includes a first receiving unit 801.

The first receiving unit 801 is configured to receive first information transmitted by a network side, the first information indicating a first RS and a second RS, the first RS being associated with a Doppler shift, Doppler spread, average delay, and delay spread, and the second RS being associated with one of the following:
average delay;
delay spread; and
average delay and delay spread.

Herein, in an embodiment, the first receiving unit 801 is configured to receive the first information transmitted by the network side by one of the following ways:
RRC signaling;
MAC CE; and
DCI.

In an embodiment, the second RS may be associated with the Doppler shift, the Doppler spread, the average delay, and the delay spread, as shown in FIG. 8, the apparatus may further include a second determination unit 802.

The second determination unit 802 is configured to determine, based on the first information, that the second RS is associated with one of:
average delay;
delay spread; and
average delay and delay spread.

In an embodiment, as shown in FIG. 8, the apparatus may further include a second transmitting unit 802.

The second determination unit 802 is further configured to determine a modulated carrier frequency of an uplink signal, the modulated carrier frequency of the uplink signal being associated with a carrier frequency at which the first RS is received, or the modulated carrier frequency of the uplink signal determining that the modulated carrier frequency of the uplink signal is unassociated with a carrier frequency at which the second RS is received.

The second transmitting unit 803 is configured to transmit the uplink signal at the determined modulated carrier frequency. The transmitted uplink signal may be configured to determine, by the network side, a Doppler shift compensation value of at least one TRP. The at least one TRP does not contain the TRP transmitting the first RS.

In practical application, the first receiving unit 801 and the second transmitting unit 803 may be implemented by a communication interface in the information transmission device. The second determination unit 802 may be implemented by a processor in the information transmission apparatus.

It is to be noted that the information transmission apparatus provided by the above embodiments is only exemplified by the division of the above program modules when performing information transmission. In practical application, the above processing and allocation may be completed by different program modules as needed, that is, the internal structure of the apparatus is divided into different program modules to complete all or part of the above-described processing. In addition, the embodiments of the information transmission apparatus and the information transmission method provided by the embodiments belong to the same concept, and the detailed implementation processes thereof are detailed in the method embodiments and are not repeated here.

Figure 9:
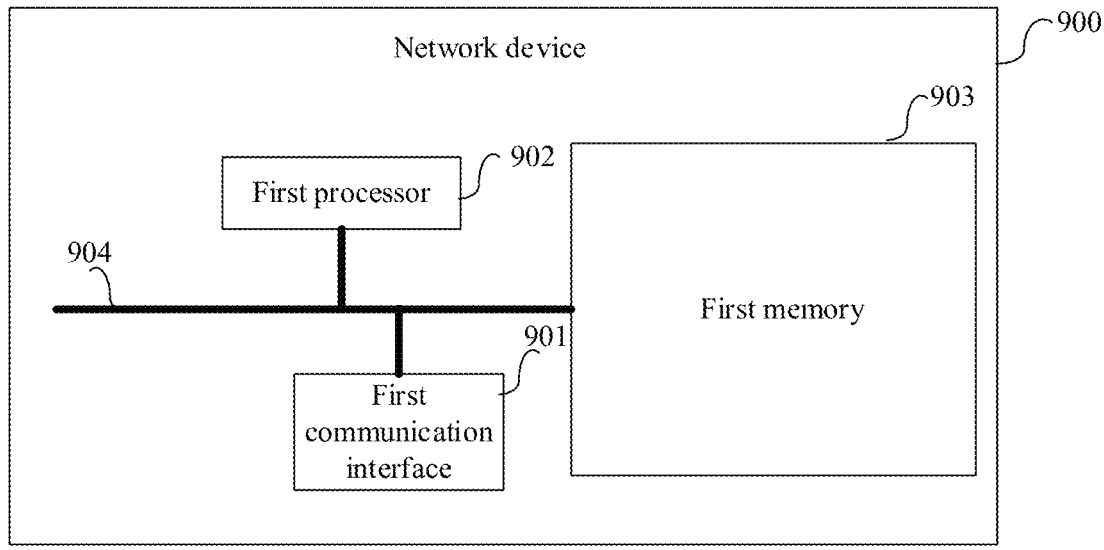
FIG. 9 is a schematic structural diagram of a network device according to an embodiment of the present disclosure.

Based on the hardware implementation of the above program modules, and in order to implement the method on the network device side of the embodiments of the present disclosure, the embodiments of the present disclosure further provide a network device, as shown in FIG. 9, the network device 900 includes: a first communication interface 901 and a first processor 902.

The first communication interface 901 is capable of performing information interaction with a terminal.

The first processor 902 is connected with the first communication interface 901 to implement information exchange with the terminal, and is configured to execute the method provided by one or more technical solutions on the network device side when running a computer program. The computer program is stored in a first memory 903.

Specifically, the first communication interface 901 is configured to transmit first information to the terminal, the first information indicating a first RS and a second RS, the first RS being associated with a Doppler shift, Doppler spread, average delay, and delay spread, and the second RS being associated with one of the following:
average delay;
delay spread; and
average delay and delay spread.

In an embodiment, the first communication interface 901 is configured to transmit the first information to the terminal by one of the following ways:
RRC signaling;
MAC CE; and
DCI.

In an embodiment, the first communication interface 901 is configured to receive an uplink signal transmitted by the terminal, a modulated carrier frequency of the uplink signal being associated with a carrier frequency at which the first RS is received, or the modulated carrier frequency of the uplink signal being unassociated with a carrier frequency at which the second RS is received.

In an embodiment, the first processor 902 is configured to:
perform frequency shift estimation by using the received uplink signal and determine a Doppler shift compensation value of at least one TRP. The at least one TRP does not contain the TRP transmitting the first RS.

It is to be noted that: the specific processing procedure of the first communication interface 901 and the first processor 902 may be understood with reference to the methods described above.

Of course, in practical application, various components in the network device 900 are coupled together through a bus system 904. It is understandable that the bus system 904 is configured to implement connection communication between these components. In addition to the data bus, the bus system 904 further includes a power bus, a control bus and a status signal bus. However, for clarity of illustration, the various buses are marked as the bus system 904 in FIG. 9.

The first memory 903 in the embodiments of the present disclosure is configured to store various types of data to support the operation of the network device 900. Examples of the data include: any computer program configured to operate on the network device 900.

The method disclosed in the above embodiments of the present disclosure may be applied to the first processor 902 or implemented by the first processor 902. The first processor 902 may be an integrated circuit chip with signal processing capabilities. In an implementation process, each step of the method may be completed by an integrated logical circuit of hardware in the first processor 902 or an instruction in a software form. The first processor 902 described above may be a general-purpose processor, a Digital Signal Processor (DSP), or other programmable logic devices, discrete gates or transistor logic devices, discrete hardware components, etc. Various methods, steps, and logic block diagrams disclosed in the embodiments of the present disclosure may be implemented or executed by the first processor 902. The general-purpose processor may be a microprocessor or any conventional processor, etc. The steps of the methods disclosed in combination with the embodiment of the present disclosure may be directly embodied as a hardware decoding processor for execution and completion, or a combination of hardware and software modules in the decoding processor for execution and completion. The software module may be located in a storage medium, which is located in the first memory 903, and the first processor 902 reads information in the first memory 903, and completes the steps of the foregoing method in combination with hardware.

In an exemplary embodiment, the network device 900 may be implemented by one or more Application Specific Integrated Circuits (ASICs), DSPs, Programmable Logic Devices (PLDs), Complex Programmable Logic Devices (CPLDs), FPGAs, general purpose processors, controllers, Micro Controller Units (MCUs), Microprocessors, or other electronic components, and is configured to execute the foregoing method.

Figure 10:
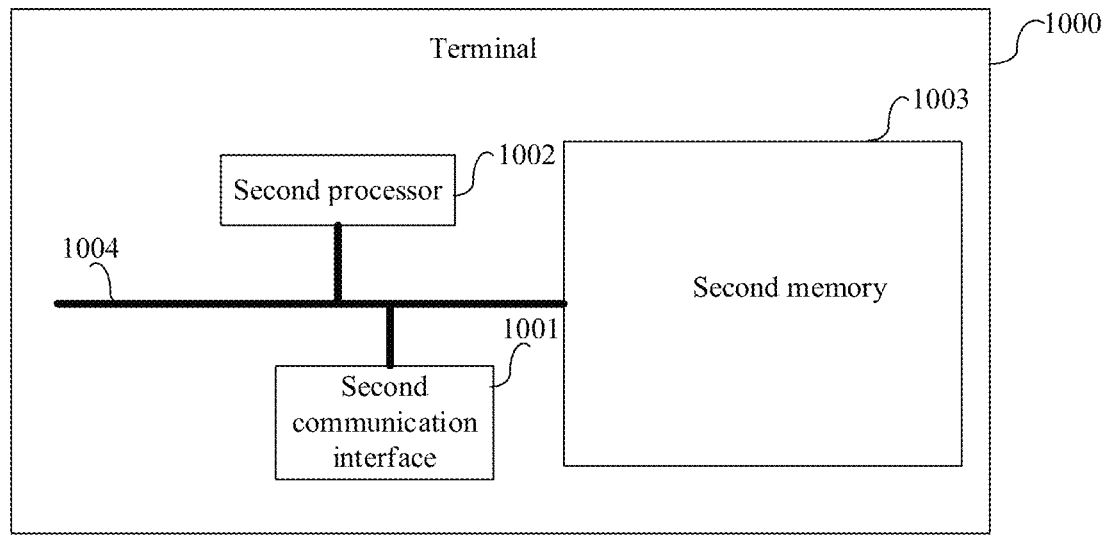
FIG. 10 is a schematic structural diagram of a terminal according to an embodiment of the present disclosure.

Based on the hardware implementation of the above program modules, and in order to implement the method on the terminal device side of the embodiments of the present disclosure, as shown in FIG. 10, the terminal 1000 includes: a second communication interface 1001 and a second processor 1002.

The second communication interface 1001 is capable of performing information interaction with the network device.

The second processor 1002 is connected with the second communication interface 1001 to implement information exchange with the network device, and is configured to execute the method provided by one or more technical solutions on the terminal side when running a computer program. The computer program is stored in a second memory 1003.

Specifically, the second communication interface 1001 is configured to receive first information transmitted by a network side, the first information indicating a first RS and a second RS, the first RS being associated with a Doppler shift, Doppler spread, average delay, and delay spread, and the second RS being associated with one of the following:
average delay;
delay spread; and
average delay and delay spread.

Herein, in an embodiment, the second communication interface 1001 is configured to receive the first information transmitted by the network side by one of the following ways:
RRC signaling;
MAC CE; and
DCI.

In an embodiment, the second RS may be associated with the Doppler shift, the Doppler spread, the average delay, and the delay spread. The second processor 1002 is configured to determine, based on the first information, that the second RS is associated with one of:
average delay;
delay spread; and
average delay and delay spread.

In an embodiment, the second processor 1002 is further configured to determine a modulated carrier frequency of an uplink signal, the modulated carrier frequency of the uplink signal being associated with a carrier frequency at which the first RS is received, or the modulated carrier frequency of the uplink signal is unassociated with a carrier frequency at which the second RS is received.

The second communication interface 1001 is further configured to transmit the uplink signal at the determined modulated carrier frequency. The transmitted uplink signal may be configured to determine, by the network side, a Doppler shift compensation value of at least one TRP. The at least one TRP does not contain the TRP transmitting the first RS.

It is to be noted that: the specific processing procedure of the second processor 1002 and the second communication interface 1001 may be understood with reference to the methods described above.

Of course, in practical application, various components in the terminal 1000 are coupled together through a bus system 1004. It is understandable that the bus system 1004 is configured to implement connection communication between these components. In addition to the data bus, the bus system 1004 also includes a power bus, a control bus and a status signal bus. However, for clarity of illustration, the various buses are marked as the bus system 1004 in FIG. 10.

The second memory 1003 in the embodiments of the present disclosure is configured to store various types of data to support the operation of the terminal 1000. Examples of these data include: any computer program configured to operate on the terminal 1000.

The method disclosed in the above embodiments of the present disclosure may be applied to the second processor 1002 or implemented by the second processor 1002. The second processor 1002 may be an integrated circuit chip with signal processing capabilities. In an implementation process, each step of the method may be completed by an integrated logical circuit of hardware in the second processor 1002 or an instruction in a software form. The second processor 1002 described above may be a general-purpose processor, a DSP, or other programmable logic devices, discrete gates or transistor logic devices, discrete hardware components, etc. Various methods, steps, and logic block diagrams disclosed in the embodiments of the present disclosure may be implemented or executed by the second processor 1002. The general-purpose processor may be a microprocessor or any conventional processor, etc. The steps of the methods disclosed in combination with the embodiment of the present disclosure may be directly embodied as a hardware decoding processor for execution and completion, or a combination of hardware and software modules in the decoding processor for execution and completion. The software module may be located in a storage medium, which is located in the second memory 1003, and the second processor 1002 reads information in the second memory 1003, and completes the steps of the foregoing method in combination with hardware.

In an exemplary embodiment, the terminal 1000 may be implemented by one or more ASICs, DSPs, PLDs, CPLDs, FPGAs, general purpose processors, controllers, MCUs, Microprocessors, or other electronic components, and is configured to execute the foregoing method.

It is understandable that the memories (the first memory 903 and the second memory 1003) in the embodiments of the present disclosure may be volatile memories or nonvolatile memories, and may also include both volatile and nonvolatile memories. Herein, the non-volatile memory may be a Read Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. By way of example, but not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memories described in the embodiments of the present disclosure are intended to include, but not be limited to, these and any other suitable types of memories.

Figure 11:
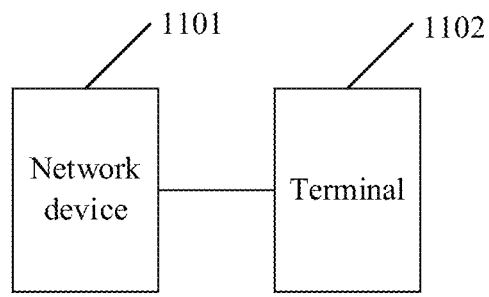
FIG. 11 is a schematic structural diagram of an information transmission system according to an embodiment of the present disclosure.

In order to implement the method of the embodiments of the present disclosure, the embodiments of the present invention further provide an information transmission system, as shown in FIG. 11, which includes: a network device 1101 and a terminal 1102.

It is to be noted that: the specific processing procedure of the network device 1101 and the terminal 1102 have been described in detail above, and will not be elaborated herein.

In the exemplary embodiment, the embodiments of the present disclosure also provide a storage medium, that is, a computer storage medium, specifically a computer readable storage medium, such as a first memory 903 including a stored computer program, which may be executed by the first processor 902 of the network device 900 to complete the steps of the foregoing method on the network device side. For another example, it may be a second memory 1003 including the stored computer program, which may be executed by the second processor 1002 of the terminal 1000 to complete the steps of the foregoing method on the terminal side. The computer readable storage medium may be the memory such as the FRAM, the ROM, the PROM, the EPROM, the EEPROM, the Flash Memory, the magnetic surface memory, the optical disk, or CD-ROM.

It is to be noted that the terms "first", "second" and the like are used to distinguish similar objects, and are not necessarily used to describe a specific order or sequence.

In addition, the technical solutions described in the embodiments of the present disclosure may be arbitrarily combined without conflict.

The description above is only the preferred embodiment of the present disclosure and is not intended to limit the scope of protection of the present disclosure.

What is claimed is:

1. An information transmission method, applied to a network device and comprising:
    transmitting first information to a terminal, wherein the first information indicates a first Transmission Configuration Indication-State (TCI-State) and a second TCI-state, the first TCI-State indicates a first Reference Signal (RS) and the second TCI-State indicates a second RS, the first RS is corresponding to QCL-TypeA {Doppler shift, Doppler spread, average delay, delay spread}, and the second RS is corresponding to the QCL-TypeA {Doppler shift, Doppler spread, average delay, delay spread} but by means of pre-configuration or signaling indication, the second RS is not associated with Doppler shift and Doppler spread or the second RS is not considered regarding the Doppler shift and the Doppler spread.

2. The method of claim 1, wherein the first information is transmitted to the terminal by one of the following ways:
    Radio Resource Control (RRC) signaling;
    Medium Access Control Control Element (MAC CE); and
    Downlink Control Information (DCI).

3. The method of claim 1, wherein the first RS comprises a first Tracking Reference Signal (TRS); and the second RS comprises a second TRS.

4. The method of claim 1, further comprising:
    receiving an uplink signal transmitted by the terminal, wherein a modulated carrier frequency of the uplink signal is associated with a carrier frequency at which the first RS is received; or the modulated carrier frequency of the uplink signal is unassociated with a carrier frequency at which the second RS is received.

5. A non-transitory storage medium on which a computer program is stored, the computer program, when executed by a processor, implementing steps of the method of claim 1.

6. An information transmission method, applied to a terminal and comprising:
    receiving first information transmitted by a network side, wherein the first information indicates a first Transmission Configuration Indication-State (TCI-State) and a second TCI-state, the first TCI-State indicates a first Reference Signal (RS) and the second TCI-State indicates a second RS, the first RS is corresponding to QCL-TypeA {Doppler shift, Doppler spread, average delay, delay spread}, and the second RS is corresponding to the QCL-TypeA {Doppler shift, Doppler spread, average delay, delay spread} but by means of pre-configuration or signaling indication, the second RS is not associated with Doppler shift and Doppler spread or the second RS is not considered regarding the Doppler shift and the Doppler spread.

7. The method of claim 6, wherein the first information transmitted by the terminal side is received by one of the following ways:
Radio Resource Control (RRC) signaling;
Medium Access Control Control Element (MAC CE); and
Downlink Control Information (DCI).

8. The method of claim 6, wherein the second RS is capable of associated with the Doppler shift, the Doppler spread, the average delay, and the delay spread;
determining, by using the first information, that the second RS is associated with one of:
average delay;
delay spread; and
average delay and delay spread.

9. The method of claim 6, wherein the first RS comprises a first Tracking Reference Signal (TRS); and the second RS comprises a second TRS.

10. The method of claim 6, further comprising:
determining a modulated carrier frequency of an uplink signal, wherein the modulated carrier frequency of the uplink signal is associated with a carrier frequency at which the first RS is received, or the modulated carrier frequency of the uplink signal is unassociated with a carrier frequency at which the second RS is received; and
transmitting the uplink signal at the determined modulated carrier frequency.

11. A terminal implementing the method of claim 6, comprising: a second communication interface and a second processor; wherein the second communication interface is configured to execute steps of the method.

12. The terminal of claim 11, wherein the first information transmitted by the terminal side is received by one of the following ways:
Radio Resource Control (RRC) signaling;
Medium Access Control Control Element (MAC CE); and
Downlink Control Information (DCI).

13. The terminal of claim 11, wherein the second RS is capable of associated with the Doppler shift, the Doppler spread, the average delay, and the delay spread;
the second processor is configured to determine, by using the first information, that the second RS is associated with one of:
average delay;
delay spread; and
average delay and delay spread.

14. The terminal of claim 11, wherein the first RS comprises a first Tracking Reference Signal (TRS); and the second RS comprises a second TRS.

15. The terminal of claim 11, the second processor is further configured to:
determine a modulated carrier frequency of an uplink signal, wherein the modulated carrier frequency of the uplink signal is associated with a carrier frequency at which the first RS is received, or the modulated carrier frequency of the uplink signal is unassociated with a carrier frequency at which the second RS is received; and
the second communication interface is configured to transmit the uplink signal at the determined modulated carrier frequency.

16. A non-transitory storage medium on which a computer program is stored, the computer program, when executed by a processor, implementing steps of the method of claim 6.

17. A network device, comprising: a first communication interface and a first processor; wherein,
the first communication interface is configured to transmit first information to a terminal, wherein the first information indicates a first Transmission Configuration Indication-State (TCI-State) and a second TCI-state, the first TCI-State indicates a first Reference Signal (RS) and the second TCI-State indicates a second RS, the first RS is corresponding to QCL-TypeA {Doppler shift, Doppler spread, average delay, delay spread}, and the second RS is corresponding to the QCL-TypeA {Doppler shift, Doppler spread, average delay, delay spread} but by means of pre-configuration or signaling indication, the second RS is not associated with Doppler shift and Doppler spread or the second RS is not considered regarding the Doppler shift and the Doppler spread.

18. The network device of claim 12, wherein the first information is transmitted to the terminal by one of the following ways:
Radio Resource Control (RRC) signaling;
Medium Access Control Control Element (MAC CE); and
Downlink Control Information (DCI).

19. The network device of claim 12, wherein the first RS comprises a first Tracking Reference Signal (TRS); and the second RS comprises a second TRS.

20. The network device of claim 17, the first communication interface is further configured to:
receive an uplink signal transmitted by the terminal, wherein a modulated carrier frequency of the uplink signal is associated with a carrier frequency at which the first RS is received; or the modulated carrier frequency of the uplink signal is unassociated with a carrier frequency at which the second RS is received.

* * * * *